US011126494B2

(12) United States Patent
Fields et al.

(10) Patent No.: US 11,126,494 B2
(45) Date of Patent: Sep. 21, 2021

(54) AUTOMATED, ADAPTIVE, AND AUTO-REMEDIATING SYSTEM FOR PRODUCTION ENVIRONMENT

(71) Applicant: PAYPAL, INC., San Jose, CA (US)

(72) Inventors: Rani Fields, Danville, CA (US); Laxmikant Sharma, Fremont, CA (US); Scott Donald Sivi, Los Gatos, CA (US); Subhadra Tatavarti, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 159 days.

(21) Appl. No.: 15/798,624

(22) Filed: Oct. 31, 2017

(65) Prior Publication Data

US 2019/0129788 A1  May 2, 2019

(51) Int. Cl.
*G06F 11/00* (2006.01)
*G06F 11/07* (2006.01)

(52) U.S. Cl.
CPC ........ *G06F 11/0793* (2013.01); *G06F 11/006* (2013.01); *G06F 11/079* (2013.01); *G06F 11/0709* (2013.01); *G06F 11/0754* (2013.01); *G06F 2201/81* (2013.01)

(58) Field of Classification Search
CPC ............... G06F 11/0793; G06F 11/006; G06F 11/0709; G06F 11/0754; G06F 11/079; G06F 11/0703; G06F 11/0706; G06F 11/0712; G06F 11/0766; G06F 11/0778; G06F 11/0787; G06F 11/3065; G06F 11/3072; G06F 2201/81
USPC ................................................ 714/4, 25, 26
See application file for complete search history.

(56) References Cited

U.S. PATENT DOCUMENTS

| 8,418,000 B1* | 4/2013 | Salame ................. G06F 11/263 714/38.1 |
| 9,037,922 B1* | 5/2015 | Cabrera .............. G06F 11/3495 714/47.1 |
| 2005/0172162 A1* | 8/2005 | Takahashi ............. G06F 11/079 714/4.4 |
| 2013/0278748 A1* | 10/2013 | Nakayama .............. G06T 7/001 348/87 |
| 2015/0113337 A1* | 4/2015 | Otsuka .................. H04L 41/147 714/47.3 |

(Continued)

OTHER PUBLICATIONS

Sharma, Lax and Fields, Rani, "Self-Analyzing & Auto-Remediating Cloud Platform Certification", OpenStack Summit Boston, Published May 9, 2017; OpenStack Foundation; [online]; ]. Retrieved from the Internet: <URL: www.youtube.com/watch?v=UmxcWWJS7IM>.

*Primary Examiner* — Anthony J Amoroso
(74) *Attorney, Agent, or Firm* — Haynes and Boone, LLP

(57) ABSTRACT

A first computer system identifies a failure case from a collected information, the collected information corresponds to one or more functions of a second system. The first computer system analyzes the failure case to determine a failure pattern. The first computer system determines whether the determined failure pattern corresponds to a stored failure pattern of a plurality of stored failure patterns in a database. In response to determining that the determined failure pattern corresponds to the stored failure pattern, the first computer system determines a remediation plan corresponding to the stored failure pattern, and utilizing the remediation plan to automatically remediate the failure case.

20 Claims, 5 Drawing Sheets

(56) References Cited

U.S. PATENT DOCUMENTS

2015/0154046 A1* 6/2015 Farkas .................... G06F 9/485
718/1
2016/0092289 A1* 3/2016 Otsuka ................ G06F 11/0751
714/37

* cited by examiner

AUTOMATED, ADAPTIVE, AND AUTO-REMEDIATING SYSTEM FOR PRODUCTION ENVIRONMENT

TECHNICAL FIELD

The present disclosure relates generally to identifying and remediating issues in a production environment, and more particularly to an automated and adaptive system for remediating issues in a production environment.

BACKGROUND

Today, current practices for testing a system that is in production includes methods for finding and fixing problems that are inefficient and time consuming. In many cases, the methods for finding and fixing problems in these systems can involve multiple manual steps such as manually analyzing results and manually debugging issues once they are identified. Methods that involve manual steps such as the ones described can waste hours of time and effort, and effectively serves as a bottleneck to the mission of finding and fixing problems quickly and efficiently.

DETAILED DESCRIPTION

Figure 1:
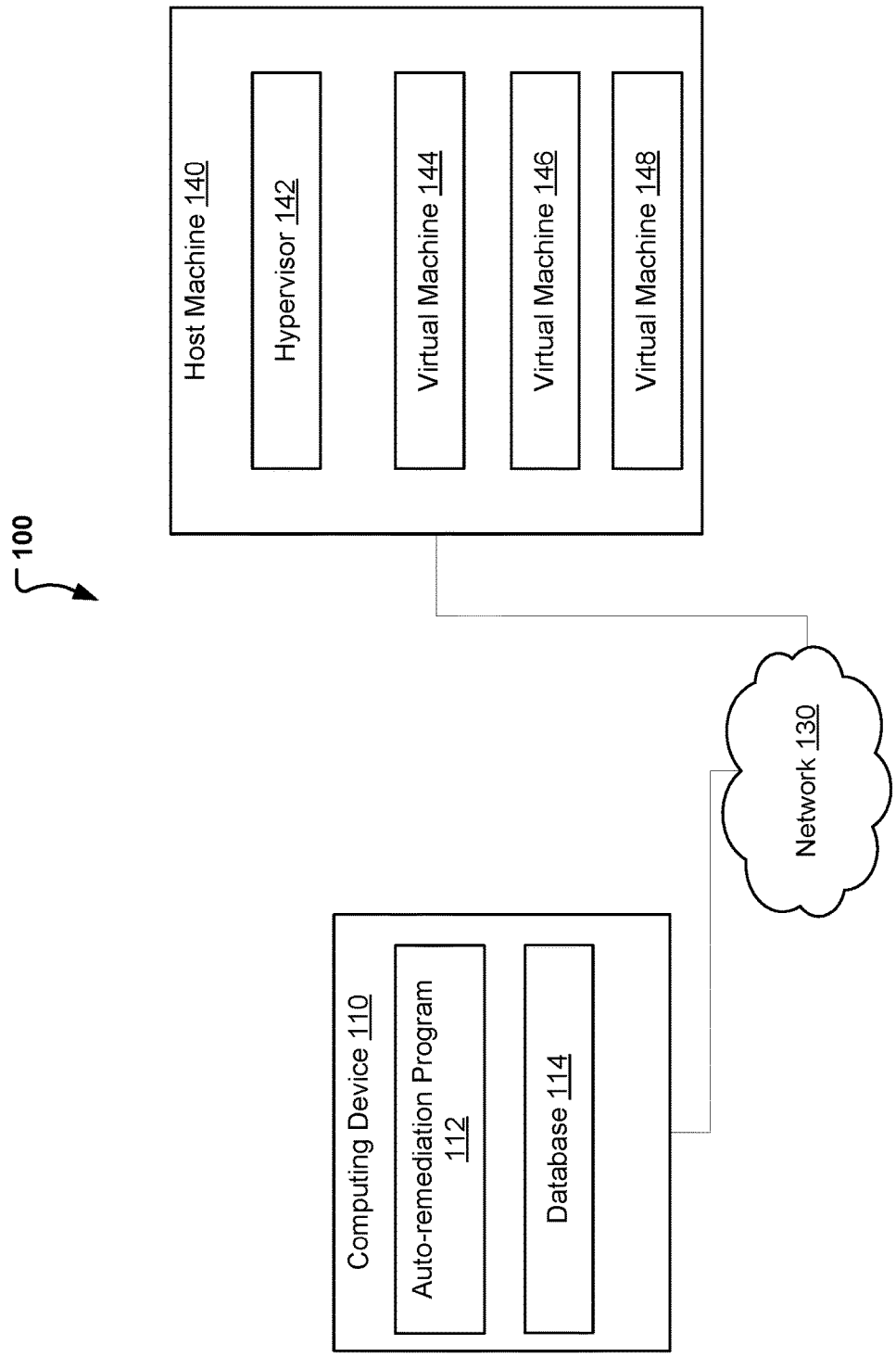
FIG. 1 illustrates an auto-remediation system, in accordance with an embodiment.

Embodiments of the present disclosure provide a system, method, and program product. A first computer system identifies a failure case from a collected information, the collected information corresponds to one or more functions of a second system. The first computer system analyzes the failure case to determine a failure pattern. The first computer system determines whether the determined failure pattern corresponds to a stored failure pattern of a plurality of stored failure patterns in a database. In response to determining that the determined failure pattern corresponds to the stored failure pattern, the first computer system determines a remediation plan corresponding to the stored failure pattern, and utilizes the remediation plan to automatically remediate the failure case.

In other embodiments, the first computer system identifies a failure case from a collected information, the collected information corresponds to one or more functions of a second system. The first computer system analyzes the failure case to determine a failure pattern. The first computer system determines whether the determined failure pattern corresponds to a pre-defined rule of a plurality of pre-defined rules in a database. In response to determining that the determined failure pattern corresponds to the pre-defined rule, the first computer system determines a remediation plan corresponding to the pre-defined rule, and utilizes the remediation plan to automatically remediate the failure case.

In the example embodiment, the present disclosure describes a solution that frequently perform automated health checks on one or more hypervisors, which are running one or more virtual machines. The present disclosure further describes analyzing the information corresponding to the frequent health checks as they occur. The present solution further describes analyzing the failure cases and determining whether one or more patterns in the failure cases correspond to any known failure patterns. If an analyzed failure case does correspond to a known failure pattern, the present solution describes an auto-remediation process where a remediation plan is identified and executed to fix the issues causing the failure. If an analyzed failure case does not correspond to a known failure pattern, the present solution describes storing the failure pattern in a database for use in the analysis of future failure cases. In the example embodiment, the present solution describes an improved method and system (and program product) for automatically identifying failure cases and remediating the failure cases without requiring manual intervention and analysis (such as required by current failure detection and remediation methods), which as described above can often be time consuming and lead to bad consumer experience. The present solution describes an auto-remediation process that can identify issues within a system or program, and further automatically remediate the issues so that they can be resolved in a timely manner, without affecting the consumer experience.

Embodiments of the present disclosure will now be described in detail with reference to the accompanying Figures.

FIG. 1 illustrates auto-remediation system 100, in accordance with an embodiment. In the example embodiment, auto-remediation system 100 includes computing device 110 and host machine 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110 and host machine 140.

Host machine 140 includes hypervisor 142, virtual machine 144, virtual machine 146, and virtual machine 148. In the example embodiment, host machine 140 may be a desktop computer, a laptop computer, a tablet computer, a mobile device, a handheld device, a thin client, or any other electronic device or computing system capable of receiving and sending data to and from other computing devices, such as computing device 110, via network 130. Although not shown, optionally, host machine 140 can comprise a cluster of servers executing the same software to collectively process requests as distributed by a front-end server and a load balancer. In the example embodiment, host machine 140 is a server that supports hypervisor 142. Host machine 140 is described in more detail with reference to FIG. 5.

In the example embodiment, hypervisor 142 is a software component that creates and runs one or more virtual machines. In other embodiments, hypervisor 142 may be a firmware or a hardware component. Hypervisor 142 is described in more detail with regard to FIG. 2 through 4.

Virtual machine 144, virtual machine 146, and virtual machine 148 are virtual machines that emulate computing devices. In the example embodiment, virtual machine 144, virtual machine 146, and virtual machine 148 are part of a hardware-assisted virtualization scheme, however, in other embodiments, virtual machine 144, virtual machine 146, and virtual machine 148 may be part of a full virtualization scheme, an operating system-level virtualization scheme, or a different virtualization scheme may be utilized. Virtual machine 144, virtual machine 146, and virtual machine 148 are described in further detail with regard to FIG. 2 through 4.

Computing device 110 includes auto-remediation program 112 and database 114. In the example embodiment, computing device 110 is a computing device such as a smartphone, however in other embodiments, computing device 110 may be a desktop computer, a laptop computer, a tablet computer, a handheld device, a thin client, or any other electronic device or computing system capable of receiving and sending data to and from other computing devices, such as host machine 140, via network 130. Computing device 110 is described in more detail with reference to FIG. 5.

Database 114 includes information describing one or more detected or historical failure patterns and one or more corresponding remediation plans. In addition, in the example embodiment, database 114 includes additional information such as the host machine(s) and the hypervisor(s) that are associated with each failure pattern in database 114. Furthermore, database 114 may include one or more pre-defined rules, such as for example, may include a rule defining that a first failure pattern includes determining that at least a threshold number of virtual machines corresponding to a specific hypervisor are experiencing failures. Database 114 is described in more detail with reference to FIGS. 2 through 4.

Auto-remediation program 112 is capable of performing health checks on one or more hypervisors and further analyzing failure cases as they emerge during these health checks. Furthermore, in the example embodiment, auto-remediation program 112 is capable of determining whether the analyzed failure cases correspond to previously identified or historical failure patterns. In addition, responsive to determining that an analyzed failure case corresponds to a previously identified or historical failure pattern, auto-remediation program 112 is capable of automatically identified a corresponding remediation method and implementing the necessary remediation steps to fixing the issue corresponding to the failure pattern. Responsive to determining that an analyzed failure case does not correspond to a previously identified or historical failure pattern, auto-remediation program 112 is capable of storing the analyzed failure pattern in database 114 for future reference. The operations of auto-remediation program 112 are described in further detail with regard to FIGS. 2 through 4.

Figure 2:
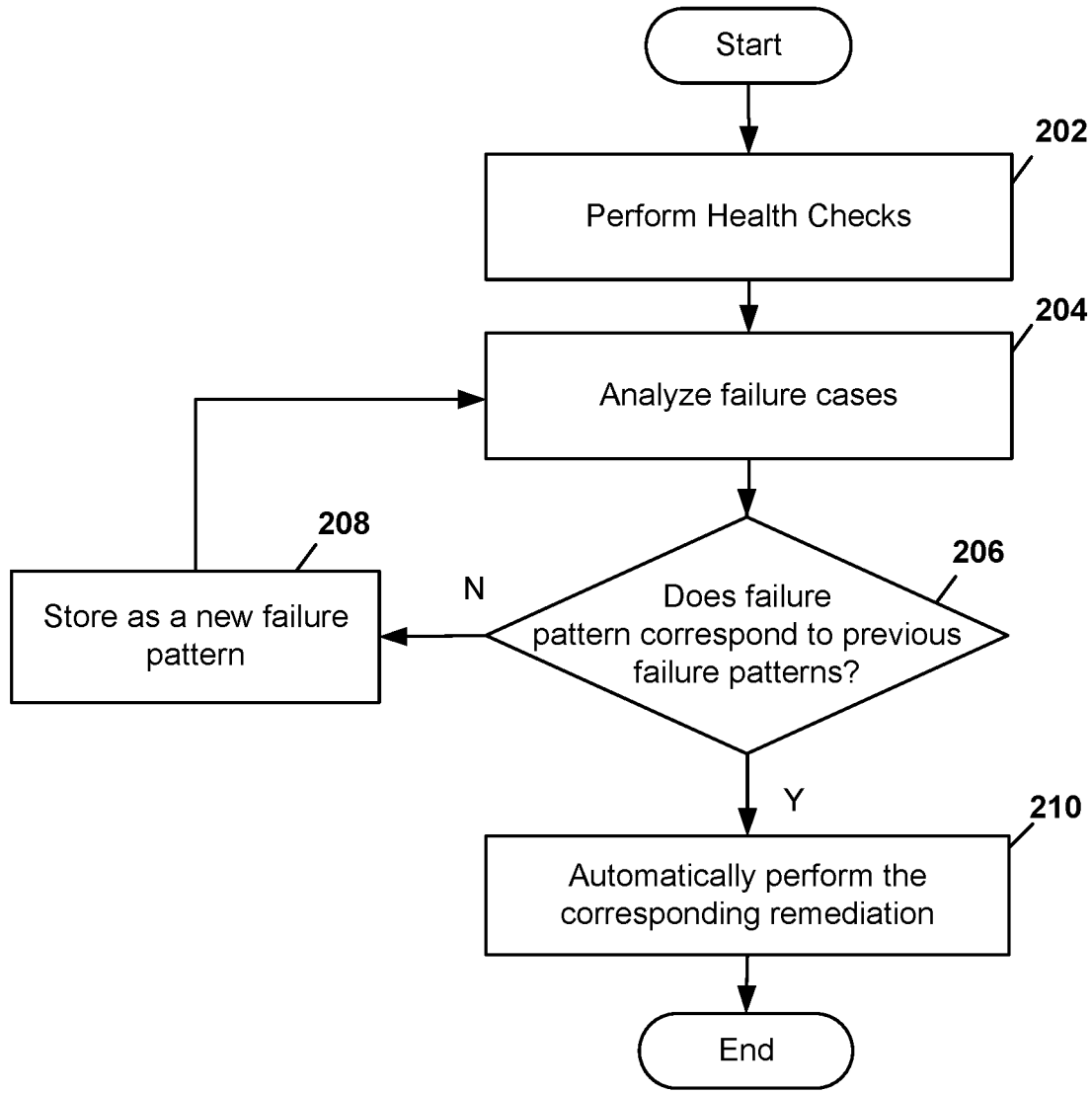
FIG. 2 is a flowchart illustrating the operations of the auto-remediation program of FIG. 1 in performing health checks on one or more systems, identifying patterns in failure cases and auto-remediating one or more of the failure cases, in accordance with an embodiment.

FIG. 2 is a flowchart illustrating the operations of auto-remediation program 112 in performing health checks on one or more hypervisors, identifying patterns in failure cases, determining whether the failure cases can be remediated, and if so, auto-remediating one or more of the failure cases, in accordance with an embodiment.

In the example embodiment, auto-remediation program 112 performs one or more health checks on hypervisor 142 (including the virtual machines running on the hypervisor, virtual machine 144, 146, and 148) (step 202). In the example embodiment, auto-remediation program 112 performs health checks on hypervisor 142 at a high level of frequency, such as for example, every few seconds, however, in other embodiments, the health checks may be performed at a higher or lower level of frequency. In the example embodiment, in performing the health checks auto-remediation program 112 gathers enough information to create a holistic snapshot of the production environment. For example, the information may include active network Ids, a CPU status, memory status, a number of virtual machines running on hypervisor 142 (along with the status of each virtual machine), and additional information. In other words, enough information is gathered with regard to the functioning of hypervisor 142 (and any other software running on host machine 140) that auto-remediation program 112 is able to create a health map of each component and function of host machine 140 (and further hypervisor 142 and any other software running on host machine 140). Furthermore, the health checks may include information describing failure cases as they occur on host machine 140.

Auto-remediation program 112 analyzes failure cases in the information gathered in the health checks (step 204). In the example embodiment, as the health checks are performed by auto-remediation program 112, auto-remediation program 112 analyzes the information gathered during the health checks to identify any failure cases that have occurred or are occurring. Furthermore, auto-remediation program 112 identifies whether one or more failure patterns exist in the identified failure cases. For example, auto-remediation program 112 may identify that one failure case includes a failure (such as a system error) occurring after a first and a second step is executed by virtual machine 144. In another example, auto-remediation program 112 may identify that failure cases have been identified in virtual machine 144, virtual machine 146 and virtual machine 148, but not in a set of other virtual machines associated with another hypervisor.

Auto-remediation program 112 determines whether the identified failure pattern(s) correspond to one or more failure patterns in database 114 (decision 206). In the example embodiment, auto-remediation program 112 compares each identified failure pattern to failure patterns stored in database 114 to identify whether a degree of similarity is above a threshold level. Referring to the example above, if a failure pattern stored in database 114 includes a failure (such as a system error) occurring after a first and a second step have been executed by a virtual machine, auto-remediation program 112 may determine that the failure pattern observed at virtual machine 144 has a degree of similarity to a failure pattern in database 114 that is above the threshold level.

If auto-remediation program 112 determines that the identified failure pattern(s) do not correspond to one or more failure patterns in database 114 (decision 206, "NO" branch), auto-remediation program 112 may store the identified failure pattern(s) in database 114 (step 208). In the example embodiment, information describing the failure pattern such as the processes being executed are stored in database 114, along with additional information such as an identifier corresponding to the virtual machine(s) associated with the identified failure pattern, an identifier corresponding to the hypervisor associated with the identified failure pattern, and any additional information associated with the identified failure pattern. Furthermore, in the example embodiment, auto-remediation program 112 may associate an indicator with the record in database 114 corresponding to the identified failure pattern to alert an administrator of computing device 110 that the identified failure pattern needs to be analyzed so that a remediation method for the failure pattern can be identified. Furthermore, in the example embodiment, once a remediation method is identified by the administrator, the remediation method may be input into database 114 in association with the identified failure pattern for future reference (when analyzing future failure cases/patterns).

If auto-remediation program 112 determines that the identified failure pattern(s) corresponds to one or more failure patterns in database 114 (decision 206, "YES" branch), auto-remediation program 112 performs the corresponding remediation steps (step 210). In the example embodiment, database 114 includes information identifying a remediation plan corresponding to each stored failure pattern. Therefore, in the example embodiment, auto-remediation program 112 references database 114 and identifies the failure pattern in database 114 that corresponds to the identified failure pattern, and further determines the remediation plan that corresponds to the failure pattern in database 114. Referring to the example above, if a failure pattern stored in database 114 includes a failure (such as a system error) occurring after a first and a second step have been executed by a virtual machine, auto-remediation program 112 may determine that the identified failure pattern has a degree of similarity above a threshold level with the failure pattern in database 114, and further auto-remediation program 112 may determine the remediation plan corresponding to the failure pattern in database 114. Furthermore, auto-remediation program 112 automatically performs the steps contained in the corresponding remediation plan.

In the example embodiment, auto-remediation program 112 analyzes each identified failure pattern separately. In other words, in the example embodiment, auto-remediation program 112 compares each identified failure pattern to the stored failure patterns in database 114, and further identifies an auto-remediation plan specific to the identified failure pattern (and subsequently may auto-remediate the failure). However, in other embodiments, auto-remediation program 112 may categorize identified failure patterns (based on similarities shared between the identified failure patterns), analyze each group of failure patterns (compare the group of failure patterns to failure patterns stored in database 114), and further auto-remediate each group of failure patterns.

In the example embodiment, auto-remediation program 112 may additionally identify group failure patterns based on observing failure patterns that share similar characteristics (such as the same hypervisor). For example, if one or more failure patterns are stored in database 114 in association with virtual machine 144 and virtual machine 146 and auto-remediation program 112 detects that a failure pattern has been observed at virtual machine 148, auto-remediation program 112 may group the failure patterns for virtual machine 144, virtual machine 146, and virtual machine 148, and further compare the group failure pattern to other historical group failure patterns stored in database 114. In other embodiments, auto-remediation program 112 may compare the group failure pattern to the pre-defined rules stored in database 114 (single failure patterns may also be compared to the pre-defined rules in some embodiments). For example, a pre-defined rule may state that if a certain threshold amount of virtual machines on a hypervisor experience a failure within a certain period of time, certain remediation steps (remediation plan) should be taken for the hypervisor. Therefore, the group failure pattern corresponding to virtual machine 144, 146, and 148 may be compared to the pre-defined rules, with auto-remediation program 112 determining that the group failure pattern corresponds to a failure pattern in database 114 (by way of determining that the group failure pattern corresponds to at least one of the pre-defined rules), and further determining to take the corresponding remediation steps on hypervisor 142. For example, auto-remediation program 112 may take hypervisor 142 offline and re-allocate the virtual machines corresponding to hypervisor 142 to another hypervisor(s). In addition, if auto-remediation program 112 determines that the group failure pattern does not correspond to at least one pre-defined rule in database 114, auto-remediation program 112 may store the group failure pattern in database 114 with an indication to alert an administrator of computing device 110 that the identified failure pattern needs to be analyzed so that a remediation method for the failure pattern can be identified, or alternatively may store the group failure pattern in database 114 so that future similar failure patterns can be added to group based on performing a comparison as described above. In addition, a similar method may be utilized for a single failure pattern.

In another example, as stated above, upon analyzing a failure case and identifying a failure pattern corresponding to the failure case, auto-remediation program 112 may compare the identified failure pattern to the failure patterns stored in database 114. If auto-remediation program 112 determines that the identified failure pattern corresponds to more than one failure patterns stored in database 114 (i.e. the degree of similarity is above a threshold level), auto-remediation program 112 may perform a further analysis to determine which failure pattern stored in database 114 has the highest degree of similarity to the identified failure pattern. This may include analyzing information such as the hypervisor corresponding to the failure pattern, comparing host machine specifications (such as a number of hypervisors associated with the host machine, a number of available hypervisors on the host machine, a status associated with the host machine, whether the host machine is serving live traffic, etc.). Once auto-remediation program 112 determines the failure pattern stored in database 114 that has the highest degree of similarity to the identified failure pattern, auto-remediation program 112 determines the remediation method corresponding to the determined failure pattern in database 114 and may automatically performs the associated remediation plan/steps as described above.

Figure 3:
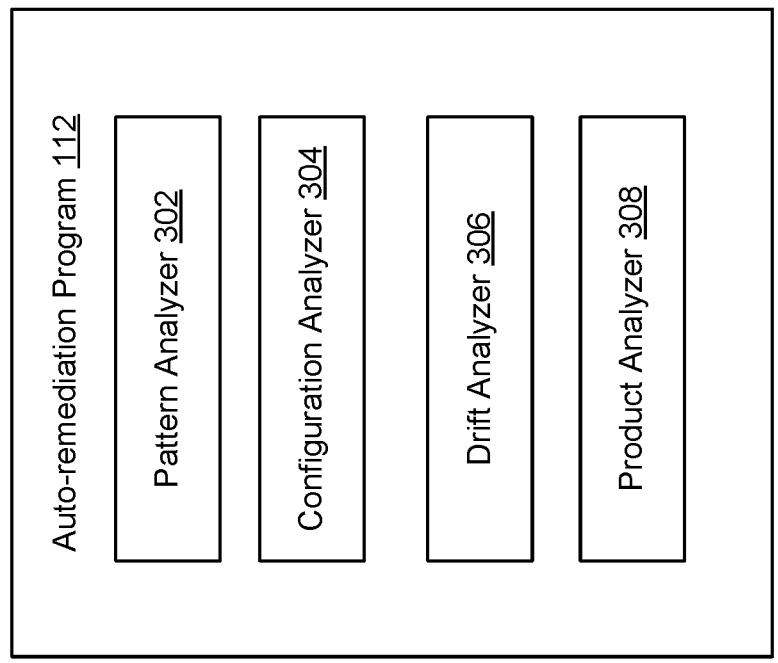
FIG. 3 is an illustration of the components of the auto-remediation program of FIG. 1, in accordance with one or more embodiments.

FIG. 3 is an illustration of components of auto-remediation program 112, in accordance with an embodiment. In the example embodiment, auto-remediation program 112 may include pattern analyzer 302, configuration analyzer 304, drift analyzer 306, and product analyzer 308. In the example embodiment, pattern analyzer 302 is a component that identifies failure patterns in failure cases and further determines if the identified failure patterns correspond to any failure patterns stored in database 114, as described above. Furthermore, in one or more embodiments, in addition to performing health checks, auto-remediation program 112 may further obtain information from a log storage database. The log storage database may be where storage systems with live products (like a Cloud Platform) keep component logs. The logs can be in form of rolling server logs, logs and responses stored in the log storage database, and/or a flat file structure. The relevant data in the log storage database may be analyzed and fed into pattern analyzer 302 along with the information obtained from the health checks in order to further assist in identifying a failure pattern.

Furthermore, in the example embodiment, configuration analyzer 304 is a component of auto-remediation program 112 that identifies a configuration corresponding to a system or a portion of a system (for example configurations for a specific hypervisor or a specific virtual machine). In addition, configuration analyzer tracks changes in configurations so that current configurations corresponding to a system can be readily identified. Furthermore, configuration analyzer 304 may store the configuration of the system in a database. In the example embodiment, drift analyzer 306 is a component of auto-remediation program 112 that determines if there is a drift from standard values in a system or a portion of a system (for example, library versions, network IDs, time zone settings, etc.). In other words, drift analyzer 306 compares the configurations identified by configuration analyzer 304 (and stored in a database) against standard configurations (that may be stored in a configuration management database). For example, the standard configurations may be a required configuration or a desired configuration. In the example embodiment, auto-remediation program 112 may utilize the configurations comparisons in determining a corresponding auto-remediation plan. For example, auto-remediation program 112 may analyze the configuration settings and determine whether a change in the configuration settings should be included as part of the auto-remediation plan.

Furthermore, in the example embodiment, product analyzer 308 is a component of auto-remediation program 112 that performs a set of checks prior to a product (or code) going live. In the example embodiment, auto-remediation program 112 may further utilize the information retrieved during these checks in conjunction with the information listed above in determining the appropriate auto-remediation plan/steps to take.

Figure 4:
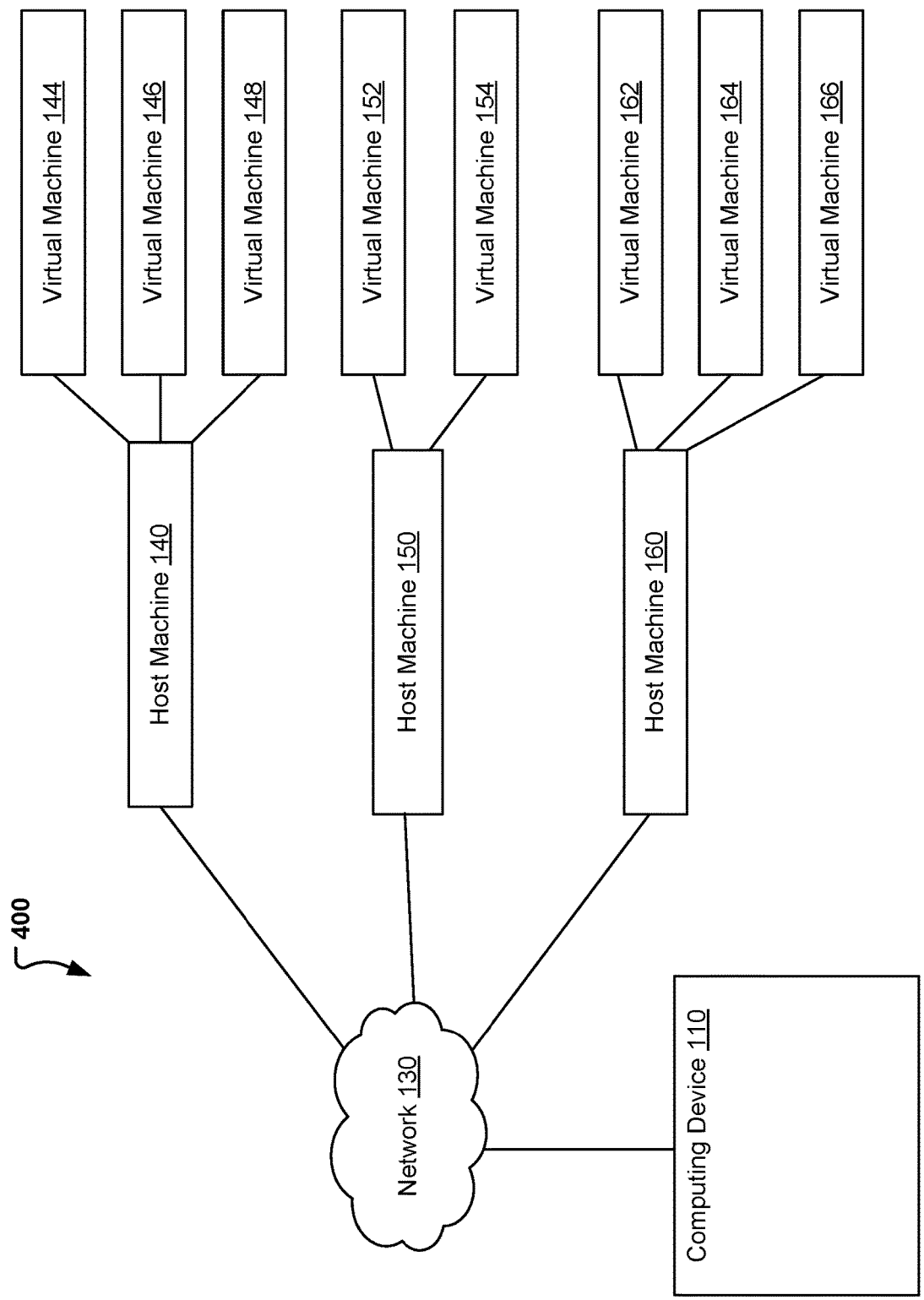
FIG. 4 depicts a view of the system of virtual machines that may exist on a group of hypervisors that are being monitored and remediated by the computing device of FIG. 1, in accordance with an embodiment.

FIG. 4 depicts system view 400, which includes a view of the system of virtual machines that may exist on a group of host machines that are being monitored and remediated by computing device 110, in accordance with an embodiment. In the example embodiment, as discussed above, hypervisor 142 located on host machine 140 may create virtual machine 144, virtual machine 146, and virtual machine 148. Furthermore, one or more hypervisors located on host machine 150 may create virtual machine 152, and virtual machine 154, and one or more hypervisors located on host machine 160 may create virtual machine 162, virtual machine 164, and virtual machine 166. Further, as discussed above, auto-remediation program 112 may perform health checks on each of the virtual machines (and also the hypervisors located on the host machines) to identify failure cases as they occur, and further auto-remediate the failure cases when possible.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
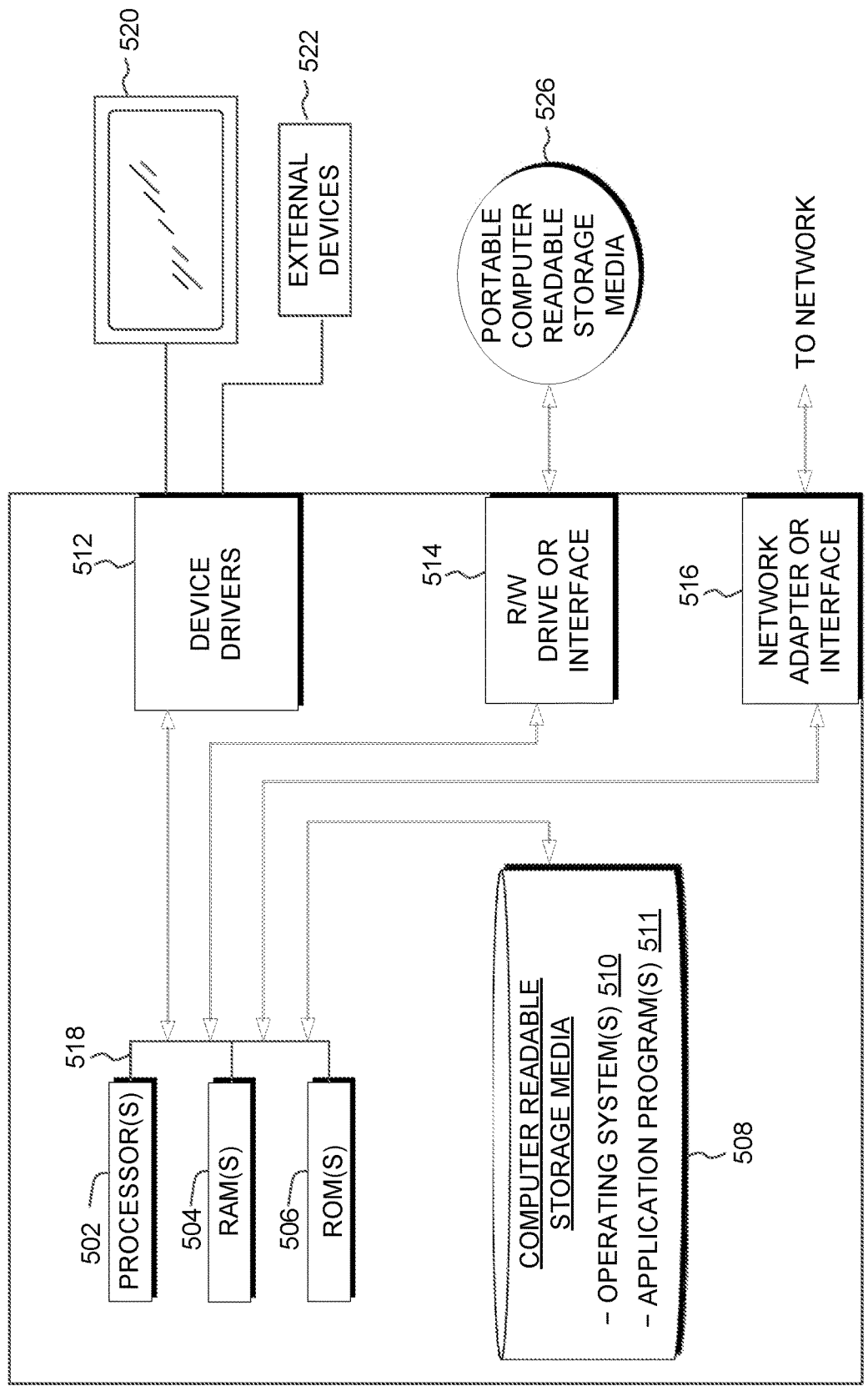
FIG. 5 is a block diagram depicting the hardware components of the auto-remediation system of FIG. 1, in accordance with an embodiment.

FIG. 5 depicts a block diagram of components of computing devices contained in auto-remediation system 100 of FIG. 1, and the computing devices contained in system view 400, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, auto-remediation program 112, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure.

Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
a non-transitory memory storing program instructions; and
one or more hardware processors coupled to the non-transitory memory and configured to execute the program instructions to cause the system to perform operations comprising:
detecting a first failure case associated with a first virtual machine hosted on a first host server based on information obtained from the first host server, wherein the first failure case indicates an occurrence of a failure event at the first virtual machine;
retrieving one or more configuration parameters associated with the first host server;
detecting a drift from a predetermined set of configuration parameters based on the retrieved one or more configuration parameters;
determining an execution sequence of a plurality of function steps performed by the first virtual machine prior to the occurrence of the failure event;
analyzing the execution sequence of the plurality of function steps performed by the first virtual machine;
determining that the first failure case associated with the first virtual machine is related to a second failure case associated with a second virtual machine hosted on the first host server based at least in part on the execution sequence of the plurality of function steps performed by the first virtual machine before the occurrence of the failure event corresponding to a particular pattern;
in response to determining that the first failure case is related to the second failure case, grouping the first and second failure cases as a group of failure cases;
determining whether the group of failure cases corresponds to a stored failure pattern of a plurality of stored failure patterns in a database by comparing the particular pattern against the plurality of stored failure patterns; and
in response to determining that the group of failure cases corresponds to the stored failure pattern, automatically reallocating the first and second virtual machines to a second host server based on the detected drift from the predetermined set of configuration parameters.

2. The system of claim 1, wherein the information obtained from the first host server includes at least one of health checks data corresponding to the first host server, one or more configurations corresponding to the first host server, or one or more component logs corresponding to the first host server.

3. The system of claim 1, wherein the determining whether the group of failure cases corresponds to the stored failure pattern of the plurality of stored failure patterns in the database comprises determining whether a degree of similarity between the particular pattern and the stored failure pattern is above a threshold level.

4. The system of claim 1, wherein the determining whether the group of failure cases corresponds to the stored failure pattern of the plurality of stored failure patterns in the database comprises:
deriving one or more characteristics that are shared between the first and second failure cases; and
determining that the one or more characteristics match characteristics associated with the stored failure pattern.

5. The system of claim 1, wherein the operations further comprise:
in response to determining that the group of failure cases does not correspond to any stored failure pattern in the database, deriving one or more characteristics that are shared between the first and second failure cases and storing the one or more characteristics as a particular failure pattern in the database.

6. The system of claim 5, wherein the operations further comprise:
receiving information corresponding to one or more remediation steps for the particular failure pattern; and
storing the one or more remediation steps in association with the particular failure pattern in the database.

7. The system of claim 1, wherein the stored failure pattern is a first stored failure pattern, and wherein the operations further comprise:
obtaining a remediation plan corresponding to the first stored failure pattern from the database;
determining that the remediation plan is shared with a second stored failure pattern; and
determining that the first stored failure pattern has a higher degree of similarity to the group of failure cases than the second stored failure pattern.

8. The system of claim 1, wherein the operations further comprise determining whether a characteristic of the first host server corresponds to a pre-defined rule in the database.

9. A method, comprising:
detecting, by one or more hardware processors, a first failure case associated with a first virtual machine hosted on a first host server based on information obtained from the first host server, wherein the first failure case indicates an occurrence of a failure event at the first virtual machine;
retrieving, by the one or more hardware processors, one or more configuration parameters associated with the first host server;
detecting, by the one or more hardware processors, a drift from a predetermined set of configuration parameters based on the retrieved one or more configuration parameters;
determining, by the one or more hardware processors, an execution sequence of a plurality of function steps performed by the first virtual machine prior to the occurrence of the failure event;
analyzing, by the one or more hardware processors, the execution sequence of the plurality of function steps performed by the first virtual machine;
determining, by the one or more hardware processors, that the first failure case associated with the first virtual machine is related to a second failure case associated with a second virtual machine hosted on the first host server based at least in part on the execution sequence of the plurality of function steps performed by the first virtual machine before the occurrence of the failure event corresponding to a particular pattern;
in response to determining that the first failure case is related to the second failure case, grouping, by the one or more hardware processors, the first and second failure cases as a group of failure cases;
determining, by the one or more hardware processors, whether the group of failure cases corresponds to a pre-defined rule of a plurality of pre-defined rules in a database; and
in response to determining that the group of failure cases corresponds to the pre-defined rule, determining, by the one or more hardware processors, a remediation plan corresponding to the pre-defined rule based on the detected drift from the predetermined set of configuration parameters, and utilizing the remediation plan to reallocate the first and second virtual machines to a second host server.

10. The method of claim 9, wherein the information obtained from the first host server comprises at least one of health checks data corresponding to the first host server, one or more configurations corresponding to the first host server, or one or more component logs corresponding to the first host server.

11. The method of claim 9, wherein the determining whether the group of failure cases corresponds to the pre-defined rule of the plurality of pre-defined rules in the database comprises:
   deriving one or more characteristics that are shared between the first and second failure cases; and
   determining that the one or more characteristics match characteristics associated with the pre-defined rule.

12. The method of claim 9, further comprising:
   in response to determining that the group of failure cases does not correspond to any pre-defined rule in the database, deriving one or more characteristics that are shared between the first and second failure cases and storing the one or more characteristics as a particular rule in the database.

13. The method of claim 9, wherein the pre-defined rule is a first pre-defined rule, and wherein the method further comprises:
   determining that the remediation plan corresponds to a second pre-defined rule; and
   determining that the first pre-defined rule has a higher degree of correspondence to the group of failure cases than the second pre-defined rule.

14. The method of claim 12, further comprising:
   receiving information corresponding to one or more remediation steps for the particular rule; and
   storing the one or more remediation steps in association with the particular rule in the database.

15. A non-transitory machine-readable medium having stored thereon machine-readable instructions executable to cause a machine to perform operations comprising:
   detecting a first failure case associated with a first virtual machine hosted on a first host server based on information obtained from the first host server, wherein the first failure case indicates an occurrence of a failure event at the first virtual machine;
   retrieving one or more configuration parameters associated with the first host server;
   detecting a drift from a predetermined set of configuration parameters based on the retrieved one or more configuration parameters;
   determining an execution sequence of a plurality of function steps performed by the first virtual machine prior to the occurrence of the failure event;
   analyzing the execution sequence of the plurality of function steps performed by the first virtual machine;
   determining that the first failure case associated with the first virtual machine is related to a second failure case associated with a second virtual machine hosted on the first host server based at least in part on the execution sequence of the plurality of function steps performed by the first host server before the occurrence of the first failure event corresponding to a particular pattern;
   in response to determining that the first failure case is related to the second failure case, grouping the first and second failure cases as a group of failure cases;
   determining whether the group of failure cases corresponds to a stored failure pattern of a plurality of stored failure patterns in a database by comparing the particular pattern against the plurality of stored failure patterns; and
   in response to determining that the group of failure cases corresponds to the stored failure pattern, automatically remediating the first failure case by reallocating the first and second virtual machines to a second host server based on the detected drift from the predetermined set of configuration parameters.

16. The non-transitory machine-readable medium of claim 15, wherein the information obtained from the first host server includes at least one of health checks data corresponding to the first host server second system, one or more configurations corresponding to the first host server, or one or more component logs corresponding to the first host server.

17. The non-transitory machine-readable medium of claim 16, wherein the determining whether the group of failure cases corresponds to the stored failure pattern of the plurality of stored failure patterns in the database comprises determining whether a degree of similarity between the particular pattern and the stored failure pattern is above a threshold level.

18. The non-transitory machine-readable medium of claim 15, wherein the determining whether the group of failure cases corresponds to the stored failure pattern of the plurality of stored failure patterns in the database includes:
   deriving one or more characteristics that are shared between the first and second failure cases; and
   determining that the one or more characteristics match characteristics associated with the stored failure pattern.

19. The non-transitory machine-readable medium of claim 15, wherein the operations further comprise:
   in response to determining that the group of failure cases does not correspond to any stored failure pattern in the database, deriving one or more characteristics that are shared between the first and second failure cases and storing the one or more characteristics as a particular failure pattern in the database.

20. The non-transitory machine-readable medium of claim 19, wherein the operations further comprise:
   receiving information corresponding to one or more remediation steps for the particular failure pattern; and
   storing the one or more remediation steps in association with the particular failure pattern in the database.

* * * * *